United States Patent [19]

Zebisch

[11] Patent Number: 4,567,376
[45] Date of Patent: Jan. 28, 1986

[54] SIGNAL GENERATOR

[75] Inventor: Manfred W. Zebisch, Georgensgmünd, Fed. Rep. of Germany

[73] Assignee: International Standard Electric Corporation, New York, N.Y.

[21] Appl. No.: 562,669

[22] Filed: Dec. 19, 1983

[30] Foreign Application Priority Data

Dec. 22, 1982 [DE] Fed. Rep. of Germany ....... 3247446

[51] Int. Cl.⁴ ............................................. H03K 3/00
[52] U.S. Cl. .................................... 307/106; 310/155; 324/171
[58] Field of Search ............... 307/106; 324/173, 174; 310/103, 155; 361/240

[56] References Cited

U.S. PATENT DOCUMENTS 3,742,243  6/1973  Gamble ............................ 324/171
4,056,747 11/1977  Orris et al. ....................... 310/155
4,063,107 12/1977  Hartig ............................... 307/106

FOREIGN PATENT DOCUMENTS 2452963  8/1974  Fed. Rep. of Germany ...... 307/106

Primary Examiner—J. R. Scott
Assistant Examiner—Todd E. DeBoer
Attorney, Agent, or Firm—T. L. Peterson; J. M. May

[57] ABSTRACT

In a signal generator with a magnetic rest, consisting of a ferromagnetic studded disk (13) with a U-shaped part (6) consisting of a permanent magnet (3) and lateral ferromagnetic small plates (4,5), two brackets (7, 8) are provided for on a support (1) between which the permanent magnet (3) and the small plates (4, 5) are capable of being clampingly inserted. This permits an easy assembly and adjustment of the permanent magnet (3) as well as of the small plates (4, 5).

5 Claims, 2 Drawing Figures

SIGNAL GENERATOR

BACKGROUND OF THE INVENTION

The present invention relates to an adjustable apparatus for use in a signal generator of the type used with a machine having a rotatable disk that includes a plurality of teeth.

A signal generator with a magnetic support structure is known from DE-GM 81 30 371. This magnetic support structure along with a U-shaped magnetizable member are arranged along the outside of a rotatable magnetic ring (that includes alternate north and south poles at defined angular distances) so that a narrow airgap is formed between the magnetizable member and the ring. The U-shaped member is inserted in a small plastics block likewise of U-shaped design. In this way, the position of the U-shaped member is predetermined. Therefore, the U-shaped member must be manufactured with a relatively high accuracy because its effectiveness strongly decreases as the distance increases, and because in the case of a smaller distance, owing to the already very small airgap, a sliding on the ring may occur, thus likewise reducing its effectiveness and increasing the torque.

SUMMARY OF THE INVENTION

It is the object of the present invention to design a magnetic support structure in such a way that a simple and reliable adjustment of the U-shaped member becomes possible. This object is achieved by the combination of a housing including a mounting bracket adapted to adjustably receive the U-shaped member, and clamping means for securing that member in the desired position with respect to a rotatable disk having a plurality of teeth.

DESCRIPTION OF THE DRAWINGS

Further advantageous details of the invention will now be described with reference to an example of embodiment illustrated in FIGS. 1 and 2 of the accompanying drawings, in which.

DESCRIPTION OF THE PREFERRED EMBODIMENT

Figure 1:
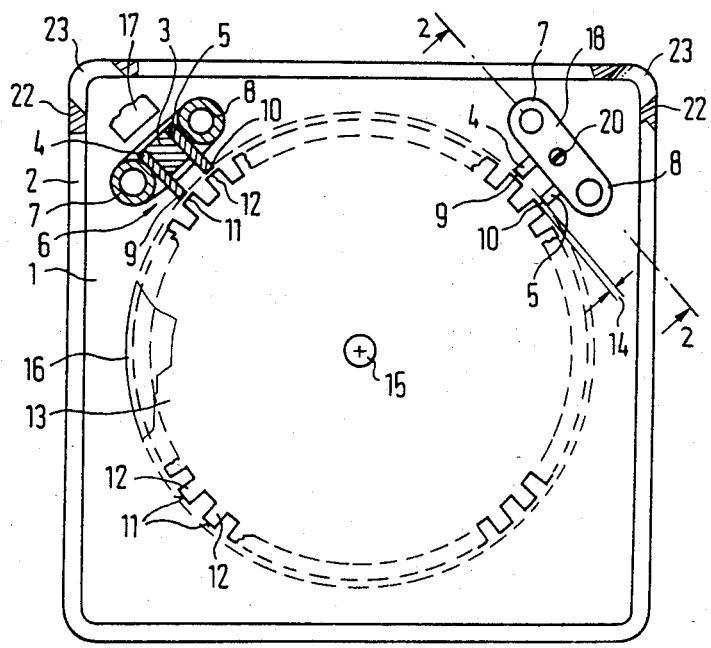
FIG. 1 is the interior view of a the cover of a housing, including a pair of mounting brackets and U-shaped members of the type contemplated by the present invention, one of said pairs being shown with its upper portion removed to illustrate the internal structure thereof.
Figure 2:
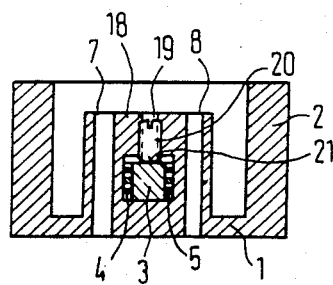
FIG. 2 is a sectional view taken on line C-D of FIG. 1.

The reference numeral 1 indicates a support, such as the cover of a housing having a peripheral rim portion 2. It may also be designed as the baseplate for a signal generator. Two vertically projecting mounting brackets 7 and 8 are provided on the support 1 in order to fix the position of U-shaped member 6, which includes a permanent magnet 3 (preferably having a square or rectangular shape) and laterally attached magnetizable small plates 4 and 5 part 6 designed as a permanent magnet 3 of preferably square or rectangular shape with laterally attached magnetizable small plates, 4, 5, each time two vertically projecting post-like brackets 7 and 8 are provided. Within the latter, the permanent magnet 3 together with its lateral small plates 4, 5, is clampingly inserted.

The inwardly projecting ends 9, 10 of the small plates 4, 5, are positioned so far apart from each other that they are located opposite the end faces 11 of respective teeth 12 of a studded disk 13 and, by leaving a small airgap therebetween, serve a signal generating function. The studded disk 13 consists of a magnetizable material.

In the support 1 there is provided a central borehole 15 which is preferably designed as a blind hole. Into this there may be inserted the shaft of an adjusting disk 16 whose radius RJ is by the airgap 14 larger than the radius RZ of the studded disk 13. For adjusting the small plates 4, 5 and the permanent magnet 3 there is inserted the adjusting disk 16, and the permanent magnet 3 together with the small plates 4, 5 is pressed with the aid of a plunger 17 from the outside towards the inside until the ends 9, 10 of the small plates 4, 5 meet against the oppositely arranged teeth 12. This completes the adjustment, and the adjusting disk 16 is replaced by the studded disk 13 or else the support, e.g. designed as the cover of a housing, is placed onto a bottom part of the housing provided with the studded disk 13. In the latter case, therefore, the adjustment can be carried out independently of the assembly of the studded disk 13, in a separate mounting support.

For securing the adjusted position, the brackets 7, 8 may be joined to one another by a web 18. In this web 18 there is provided a borehole 19 with a headless screw 20 screwed therein. The end 21 of the headless screw 20, when being screwed-in, presses against the permanent magnet 3, thus securing the adjusted position thereof. If so required, a pressure plate may still be provided for between the headless screw 20 and the permanent magnet 3, and the small plates 4, 5.

The brackets 7, 8 appropriately have a hollow inside, for example, are designed as tubular sections. In this way there is obtained an elastic deflection of the sidewall members cooperating with the small plates 4, 5 by simultaneously maintaining a high mechanical stability of the brackets 7, 8.

The brackets 7, 8 and the web 18 are suitably made of an elastic plastics material. In particular, they form one structural unit together with the support 1 consisting of such a material.

Preferably, the support 1 is square or rectangular in outline and the brackets 7, 8 are each provided for within the area of a corner 22.

For adjusting both the permanent magnet 3 and the small plates 4, 5 an opening 23 may be provided for within the marginal area or rim portion 2 of the support 1 through which the plunger 17 may be inserted and the adjustment may be carried out.

I claim:

1. An adjustable apparatus used in generating a signal indicative of the rotation of a shaft in a machine of the type having a rotatable ferromagnetic disk that includes a plurality of teeth on the peripheral rim, comprising:
   (a) a U-shaped member including a permanent magnet having a pair of magnetizable plates positioned on opposite sides thereof and extending therefrom,
   (b) a housing havng a wall parallel to said disk including a mounting bracket adapted to receive said U-shaped member, including two post-like brackets perpendicular to said wall for positioning said U-shaped member with said magnetizable plates extending toward said teeth on the rim of said disk, and a web that bridges said post-like brackets with a threaded hole in the center thereof, and (c) clamping means for securing said member to said bracket when the plates thereof have been located at a desired distance from said teeth, said clamping means comprising a set screw passing through said threaded hole in said web.

2. The apparatus of claim 1 in which said bracket is formed integrally with the wall of said housing.

3. The apparatus of claim 2 in which the housing is composed of plastic material that allows said brackets to be elastically deformed as a result of the insertion of said U-shaped member between said brackets, thereby increasing the mechanical stability of the mounting of said U-shaped member.

4. The apparatus of claim 1 in which the housing defines an opening through which the position of said U-shaped member may be adjusted with respect to the teeth of said disk prior to tightening said set screw of the clamping means.

5. The apparatus of claim 1 including an adjusting disk for use in establishing said desired distance, said adjusting disk having a diameter greater than that of said rotatable disk and being adapted for attachment to said housing wall when the position of said member is being adjusted.

* * * * *